(12) United States Patent
Sahashi et al.

(10) Patent No.: US 7,896,553 B2
(45) Date of Patent: Mar. 1, 2011

(54) BEARING DEVICE FOR WHEEL

(75) Inventors: Koji Sahashi, Iwata (JP); Yoshiaki Kuchiki, Iwata (JP); Shinji Morita, Iwata (JP)

(73) Assignee: NTN Corporation, Osaka (JP)

( * ) Notice: Subject to any disclaimer, the term of this patent is extended or adjusted under 35 U.S.C. 154(b) by 1049 days.

(21) Appl. No.: 11/658,777

(22) PCT Filed: Jul. 25, 2005

(86) PCT No.: PCT/JP2005/013556
§ 371 (c)(1),
(2), (4) Date: Jan. 29, 2007

(87) PCT Pub. No.: WO2006/011437
PCT Pub. Date: Feb. 2, 2006

(65) Prior Publication Data
US 2009/0190872 A1   Jul. 30, 2009

(30) Foreign Application Priority Data
Jul. 29, 2004   (JP) ................. 2004-221168

(51) Int. Cl.
*F16C 41/00*   (2006.01)
(52) U.S. Cl. ........................................... 384/448
(58) Field of Classification Search .............. 384/448; 340/572.7, 572.8
See application file for complete search history.

(56) References Cited

U.S. PATENT DOCUMENTS

| 6,471,407 | B1 | 10/2002 | Katano |
| 6,501,382 | B1 * | 12/2002 | Rehfus et al. ............... 384/459 |
| 6,605,938 | B1 | 8/2003 | Sentoku et al. |
| 6,695,483 | B2 | 2/2004 | Sakatani et al. |
| 7,534,045 | B2 | 5/2009 | Nakajima et al. |
| 2003/0030565 | A1 | 2/2003 | Sakatani et al. |
| 2003/0048962 | A1 | 3/2003 | Sato et al. |
| 2003/0110860 | A1 | 6/2003 | Okada |
| 2003/0218548 | A1 | 11/2003 | Sato et al. |

FOREIGN PATENT DOCUMENTS

| CN | 1424212 | 6/2003 |
| CN | 1514989 | 7/2004 |
| JP | 11-255224 | 9/1999 |
| JP | 2000-346858 | 12/2000 |
| JP | 2002-49900 | 2/2002 |
| JP | 2002-169858 | 6/2002 |
| JP | 2002-227863 | 8/2002 |
| JP | 2002-306833 | 10/2002 |
| JP | 2002-536726 | 10/2002 |

(Continued)

OTHER PUBLICATIONS

International Search Report for PCT/JP2005/013556 mailed Oct. 25, 2005 (2 pages).

(Continued)

*Primary Examiner* — Thomas R Hannon
(74) *Attorney, Agent, or Firm* — Osha • Liang LLP

(57) ABSTRACT

An IC tag (9) capable of contactless communication is affixed on any one or more of element parts constructing the bearing device (1) for the wheel. For example, the IC tag is affixed on a forging forming an outer member (31) or an inner member (32). The place of installation of IC tag 9 is preferably chosen to be a surface of the forged component part which is not machined subsequent to forging.

5 Claims, 8 Drawing Sheets

FOREIGN PATENT DOCUMENTS

| | | |
|---|---|---|
| JP | 2003-22492 | 1/2003 |
| JP | 2003-186519 | 7/2003 |
| JP | 2003-232345 | 8/2003 |
| JP | 2003-246201 | 9/2003 |
| JP | 2003-271216 | 9/2003 |
| JP | 2004-142577 | 5/2004 |
| JP | 2004-203209 | 7/2004 |
| JP | 2005-353026 | 12/2005 |
| WO | 00/45324 | 8/2000 |
| WO | WO-02/101675 | 12/2002 |

OTHER PUBLICATIONS

Patent Abstracts of Japan 2004-203209 dated Jul. 22, 2004 (2 pages).
Patent Abstracts of Japan 2002-049900 dated Feb. 15, 2002 (2 pages).
Patent Abstracts of Japan 2002-169858 dated Jun. 14, 2002 (2 pages).
Patent Abstracts of Japan 2002-227863 dated Aug. 14, 2002 (1 page).
Japanese Notification of Reasons for Rejection for Application No. 2004-221168, mailed on Jan. 12, 2010 (4 pages).
Extended European Search Report for Application No. 05761713.6-2424, mailed on Jan. 20, 2010 (6 pages).
Chinese Office Action for Chinese Application No. 2005800254685, mailed on May 9, 2008 (1 page).
esp@cenet patent abstract for Chinese Publication No. 1424212, Publication date Jun. 18, 2003 (1 page).
esp@cenet patent abstract for Chinese Publication No. 1514989, Publication date Jul. 21, 2004 (1 page).
Patent Abstracts of Japan for Japanese Publication No. 2004-142577, Publication date May 20, 2004 (1 page).
International Search Report for International Application No. PCT/JP2005/013557, mailed on Nov. 1, 2005 (2 pages).
Patent Abstracts of Japan for Japanese Publication No. 2003-022492, Publication date Jan. 24, 2003 (1 page).
Patent Abstracts of Japan for Japanese Publication No. 2003-246201, Publication date Sep. 2, 2003 (1 page).
Patent Abstracts of Japan for Japanese Publication No. 2003-232345, Publication date Aug. 22, 2003 (1 page).
Patent Abstracts of Japan for Japanese Publication No. 2002-306833, Publication date Oct. 22, 2002 (1 page).
Patent Abstracts of Japan for Japanese Publication No. 2001-021577, Publication date Jan. 26, 2001 (1 page)
Patent Abstracts of Japan for Japanese Publication No. 2005-353026, Publication date Dec. 22, 2005 (1 page).
Japanese Notification of Reasons for Rejections in related patent application No. 2004-230333, dated Jun. 1, 2010, and English translation thereof, 6 pages.
Patent Abstracts of Japan for patent application with Publication No. 2003-271216, Publication Date: Sep. 26, 2003, 1 page.
Via espacenet, corresponding Abstract of corresponding document WO 00/45324, for Patent Abstracts of Japan for patent application with Publication No. 2002-536726, dated Oct. 29, 2002, 1 page.
Patent Abstracts of Japan for patent application with Publication No. 11-255224, Publication Date: Sep. 21, 1999, 1 pagea.
Patent Abstracts of Japan for patent application with Publication No. 2003-186519, Publication Date: Jul. 4, 2003, 1 page.
U.S. Office Action Issued in related Application with U.S. Appl. No. 11/658,725, mailed on Jun. 11, 2010, 17 pages.
Notification of Reason(s) for Rejection for Japanese patent application No. 2004-222912, Dated Sep. 14, 2010, and English translation thereof, 6 pages.
Patent Abstracts of Japan for Patent Application with Publication No. 2000-346858, Publication Date: Dec. 15, 2000, 1 page.
Notice of Allowance for related U.S. Appl. No. 11/658,725, mailed Oct. 5, 2010, 10 pages.

* cited by examiner

BEARING DEVICE FOR WHEEL

FIELD OF THE INVENTION

The present invention relates to a bearing device for a wheel, which has an IC tag such as, for example, an RFID tag affixed thereto.

BACKGROUND OF THE INVENTION

The IC tag adopting the RFID (Radio Frequency Identification) capable of contactless communication is being compactized and comes to be largely employed in the distribution of goods. Also, in recent years, demands for the traceability of the products, that is, demands for the capability of pursuing the history, applicability and/or whereabouts of products to be identified are increasing, and the system has been suggested, in which ID codes and/or information associated therewith are stored in IC tags affixed to various machine component parts such as, for example, gears so that they can be managed. (See, for example, the Japanese Laid-open Patent Publication No. 2002-049900.)

Since the bearing device for the wheel is an automobile underbody component part, it is frequently realized that for security purpose an identification information and/or a history information on the bearing device for the wheel is made available even after use at the time of regular servicing or an automobile accident. In the bearing device for the wheel, management of the identification information or the like is carried out by each imprint on the bearing device for the wheel, a computer control and a forms control or the like by a bearing device manufacturer and an automobile manufacturer. (See, for example, the Japanese Laid-open Patent Publication No. 2002-049900.)

In the bearing device for the wheel, if the manufacturer's serial number of a bearing device for wheel is available at the time of the regular servicing or any other required inspection, various pieces of information on that bearing device for the wheel can be ascertained. They can also be ascertained even from the manufacturer's serial number or information concerning the date of manufacture and the site of manufacture, which are imprinted on the bearing device for the wheel.

However, the information such as, for example, the manufacturer's serial number, the date of manufacture and/or the site of manufacture, which are imprinted on the bearing device for the wheel, cannot be examined unless the device is dismantled from a knuckle or the like. Because of this, disassembling and reassembling requires complicated labors. With the imprints, it often occurs that they cannot be discriminated once the surroundings are corroded and/or deteriorated as a result of the use thereof for a long time.

Also, with the recording of information by way of imprinting, the amount of information that can be recorded is limited and it is therefore difficult to perform a sufficient control. Because of this, it is necessary to refer to a computer for administrative use and/or a record book, resulting in a time-consuming labor. To record and control the details, including each individual information on the manufacture of a vast number of bearing device for the wheels is impossible to achieve in view of the retrieval time.

SUMMARY OF THE INVENTION

An object of the present invention is to provide a bearing device for a wheel, in which information on such bearing device for wheel can be easily ascertained without the bearing device for wheel removed from an automotive vehicle.

Another object of the present invention is to enable the use of an IC tag of a kind unable to be affixed directly to a metallic surface.

A further object of the present invention is to facilitate a recording of information on the manufacture of element parts.

A still further object of the present invention is to facilitate a recording of information on the IC tag at the time of shipment.

The bearing device for the wheel of the present invention is characterized in that in a bearing device for wheel for rotatably supporting a wheel relative to a vehicle body, which comprises an outer member having an inner periphery formed with double rows of raceway surfaces, an inner member having raceway surfaces opposed to the above described raceway surfaces, and double rows of rolling elements interposed between those opposed raceway surfaces of the outer and inner members, and an IC tag capable of accomplishing a communication on a contactless basis. By way of example, the IC tag is affixed to one or a plurality of element parts.

According to the present invention, since the IC tag is affixed to the bearing device for the wheel, it is possible to record an identification information such as, for example, the manufacturer's lot number and serial number of the bearing device for the wheel and also to record a manufacturing history information in the IC tag. Since a contactless communication type is used for the IC tag, the use of an appropriate IC tag communicating device allow the recorded information to be read without the necessity of the bearing device for the wheel being removed from the automotive vehicle. Because of this, at the time of regular servicing and/or when the necessity arises, information desired to know about the bearing device for the wheel can be obtained easily. If the IC tag is employed having a large capacity, an entire manufacturing history of all element parts forming the bearing device for the wheel can be stored in the IC tag. In such case, with no need to refer to a database, the manufacturing history of the bearing device for the wheel can easily be read out.

Where the IC tag is affixed, it may be affixed to a surface of one of the element parts forming the bearing device for the wheel or fitted so as to be embedded. If it is affixed in a form as embedded, a problem of interference with any other article and a problem of separation will occur hardly. Where the IC tag is of a type that cannot be affixed directly to a metallic surface, a tag mounting recess may be provided in one of the element parts, which is made of a metallic material, an insulating member for covering an inner surface of this tag mounting recess may be then provided, and the IC tag may be affixed in the form as embedded in this insulating member.

The provision of the insulating member for covering the inner surface of the tag mounting recess in the manner described above makes it possible to accomplish reading of the IC tag without being accompanied by a problem associated with radio wave absorption.

Where the outer member or the inner member is in the form of a forged component part, the IC tag referred to above may be affixed to such forged component part. In such case, the place of installation of the IC tag is preferably chosen to be a surface of the forged component part which is not machined subsequent to forging.

In the bearing device for the wheel, the hub and the inner race, both forming respective parts of the inner member, or a member which forms the outer member are generally constructed of a forged component part. While portions of this forged component part, which must meet with requirements as to the shape and dimensional precision, are generally machined and the raceway surface is further ground, it may have surfaces, which remain as forged or subjected to a shot blasting and is left unprocessed mechanically, for example, unmachined. If the surface left as forged is used for attachment of the IC tag and the IC tag is affixed thereto after the forging, it is possible to efficiently write manufacturing information on various subsequent process steps in the IC tag for each manufacturing process step. Because of this, it is possible to efficiently record manufacturing information of machining and inspection data and so on. By way of example, the manufacturing process steps ranging from a primary machining to grinding by way of induction hardening and secondary machining can be left recorded. It is to be noted that since an induction hardening is generally employed for the heat treatment, if the IC tag is affixed immediately after the forging, it is possible for the IC tag to be little affected by influences brought about by the heat treatment.

Where the inner member is made up of a hub and an inner race mounted on an outer periphery of the hub, in which the hub is a forged component part, the IC tag may be affixed to an outboard side end face of the hub on an inner diametric side of a wheel pilot. The inner race comprises one row and double rows.

Since the outboard side end face is generally finished as forged, it is convenient to record the manufacturing information as discussed above. Also, since the outboard side end face is oriented outwardly of the automotive vehicle when in a condition with the bearing device for the wheel mounted on the automotive vehicle, when an IC tag reader or the like is brought close while the bearing device for the wheel remains fitted to the automotive vehicle, the stored information can be read out easily.

Other than the above described place of installation, the IC tag may be affixed to a wheel mounting bolt. In other words, where the inner member or the outer member has a wheel mounting flange and this flange has a bolt press-fit hole at a plurality of locations circumferentially thereof, the IC tag may be affixed to an end face of a wheel mounting bolt press-fitted in to the bolt press-fit hole. Since a large ambient space can be obtained at the end face of the wheel mounting bolt, communication with the IC tag can be accomplished easily.

In the case of the bearing device for the wheel including a retainer made of a synthetic resin as a retainer for retaining each row of the rolling element, the IC tag referred to above may be affixed to the retainer. If the retainer is made of a synthetic resin, even the IC tag of a kind incapable of being affixed directly to a metallic surface can be affixed with no problem.

In the present invention, where a sensor of a kind, that is inspected in an entire number thereof at the time of shipment, is used, the IC tag may be affixed to the sensor, an object to be detected therefor or a component part used to secure the sensor or the object to be detected.

Also, in the case of the bearing device for the wheel, in which an encoder, serving as the object to be detected, is mounted on one of the inner member and the outer member and, on the other hand, a rotary sensor for detecting the encoder is mounted on the other of the inner member and the outer member, the IC tag may be affixed to the sensor, the object to be detected or a sensor associated component part, used to secure one of them to the inner member or the outer member. The rotary sensor is of a type used in controlling the anti-lock brake system.

The sensor such as, for example, the rotation sensor is generally inspected in an entire number thereof at the time of shipment. For this reason, it is possible to write information on, for example, the initial performance or the like in the IC tag at the time of shipment during the inspection. The information so written can be read out at any time when the necessity arises for inspection purpose or the like.

While the bearing device for the wheel generally has a seal for sealing a bearing space delimited between the outer member and the inner member, the IC tag referred to above may be affixed to this seal.

Since the seal is disposed at a location exposed to the outside, affixture of the IC tag thereto can facilitate communication with the IC tag. Also, as compared with the case, in which the IC tag is affixed to the inner member or the outer member, which are manufactured through a number of manufacturing process steps, affixture of the IC tag to the seal, which can be manufactured easily, is effective to simplify an IC tag mounting work.

In the bearing device for the wheel of the present invention, the IC tag may be affixed to the plurality of the element parts. In such case, one of the IC tags may be recorded with information on the bearing device for the wheel and the other of the IC tags may be recorded with information on the element part, to which the IC tag is affixed.

The provision of the IC tags recorded with the information on the element parts, in addition to the IC tag recorded with the entire information, is convenient for recording of the manufacturing information on the element parts and, if information on the material for the element parts is recorded, it is convenient to sort the element parts at the time of disposal thereof.

As mentioned above, since the bearing device for the wheel of the present invention is of a type, in which the IC tag capable of accomplishing a contactless communication is affixed, it is possible to easily ascertain the information on the bearing device for the wheel with no need to remove the bearing device for the wheel from the automotive vehicle.

Where the IC tag is affixed to a metallic element part, which forms the bearing device for the wheel, such element part may have a tag mounting recess defined therein and, where the IC tag is affixed as embedded in the insulating member used for covering the inner surface of the tag mounting recess, the IC tag of a kind incapable of being affixed directly to the metallic surface can be employed with no problem occurring in communication.

Where the place of installation of the IC tag is chosen to be a surface of the forged component part, where no mechanical process is applied subsequent to the forging, the manufacturing information can be written in the IC tag, affixed to the forged component part, directly at each stage of the manufacturing process steps and writing of the information on each process steps subsequent to the forging can be carried out efficiently.

Where the sensor of a kind that is inspected in an entire number at the time of shipment is employed, and where the IC tag is affixed to the sensor or the object to be detected therefor or the sensor associated component part, which is a component part used to secure the sensor or the object to be detected, recording of the shipment information in the IC tag can be accomplished easily.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
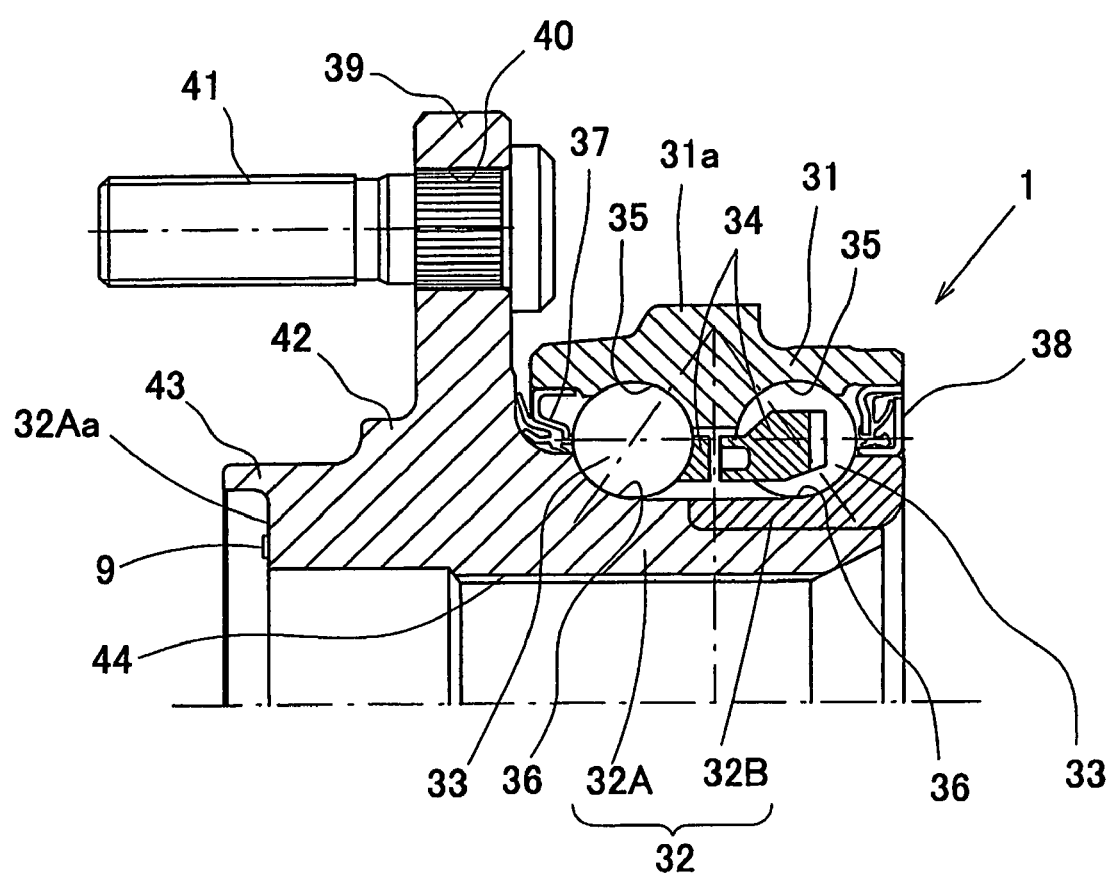
FIG. 1 is a fragmentary sectional view of a bearing device for wheel according to a first preferred embodiment of the present invention.

A first preferred embodiment of the present invention will be described with particular reference to FIG. 1. This bearing device for the wheel 1 is of a third generation model of an inner race rotating type and is adapted to support a driven wheel. It is to be noted that in this specification, the position of the bearing relative to a vehicle body that lies on one side of the vehicle body structure remote from the longitudinal center of the vehicle body is referred to as an outboard side and the position of the bearing relative to a vehicle body that lies on the opposite side of the vehicle body structure close towards the longitudinal center of the vehicle body is referred to as an inboard side. In FIG. 1, a left side is the outboard side and a right side is the inboard side.

This bearing device for the wheel 1 includes an outer member 31 having an inner periphery formed with double rows of raceway surfaces 35, an inner member having raceway surfaces 36 opposed to the above described raceway surfaces 35, and double rows of rolling elements 33 interposed between the opposed raceway surfaces 35 and 36 of the outer and inner members 31 and 32. A bearing space delimited between the outer member 31 and the inner member 32 have opposite ends sealed respectively by seals 37 and 38.

This bearing device for the wheel 1 is rendered to be a double row angular contact ball bearing assembly and each of the raceway surfaces 35 and 36 is of an arcuate shape in section and the raceway surfaces 35 and 36 are so formed as to have respective contact angles held in back-to-back relation with each other. The rolling elements 33 are in the form of a ball and are retained by a retainer 34 employed for each row of those rolling elements 33.

The outer member 31 serves as a fixed side member and is of a unitary structure adapted to be secured to a knuckle (not shown) of an automotive suspension system. This outer member 31 has an outer periphery formed with a vehicle body fitting flange 31a that is to be secured to a knuckle (not shown). The outer member 31 is a forged component part. The inner member 32 is made up of an hub 32A and an inner race 32B mounted on an outer periphery of an inboard side end of the hub 32A, with the rows of the raceway surfaces 36 defined in the hub 32A and the inner race 32B. Each of the hub 32A and the inner race 32B is a forged component part.

The hub 32A has a wheel mounting flange 39 on an outer periphery of an outboard side portion of the outer member 31, and this flange 39 is provided with a plurality of bolt press-fit holes 40 defined therein in a direction circumferentially thereof. Respective wheel mounting bolts 41 are press-fitted into those bolt press-fit holes 40.

On an outboard side of the hub 32A remote from the flange 39, a brake pilot 42 and a wheel pilot 43 are provided. Also, the hub 32A has an inner diametric hole 44 that is splined, and a stem portion (not shown) of a constant velocity universal joint outer race is inserted into and then splined to the inner diametric hole 44. When a nut is threaded to a male thread portion of a free end of the stem portion referred to above, the inner member 32 and the constant velocity universal joint outer race are integrally coupled for rotation together.

An IC tag 9 of a contactless communication type is affixed to the inner member 32 of this bearing device for the wheel 1. The place at which the IC tag 9 is affixed is chosen to be an outboard side end face 32Aa that is positioned on an inner diametric side of the hub 32A with respect to the wheel pilot 43. It is however to be noted that where this end face 32Aa serves as a bearing face for a nut (not shown) for connection with the constant velocity universal joint outer race, it is fitted to the place excluding a portion that defines the bearing face.

The IC tag is, in this instance, affixed to the above described end face 32Aa by means of sticking. It is to be noted that the IC tag 9 is of a kind capable of being affixed either to a metallic surface or through the intervention of an insulating material or a radio interference noise suppressing material (not shown) such as dielectric substance.

Figure 11:
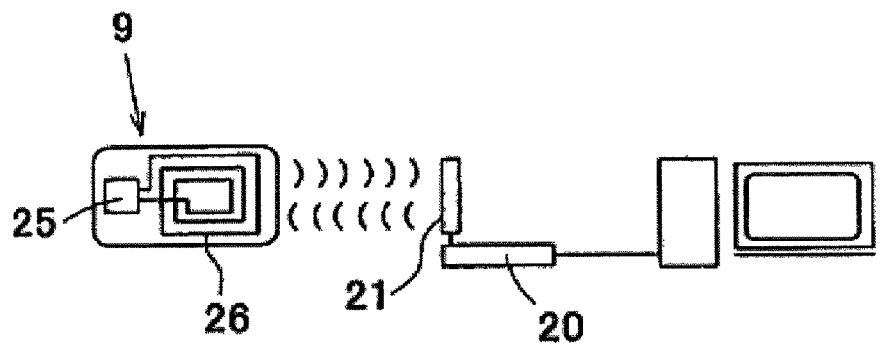
FIG. 11 is an explanatory diagram showing a relation between the IC tag and a tag communicator.
Figure 12:
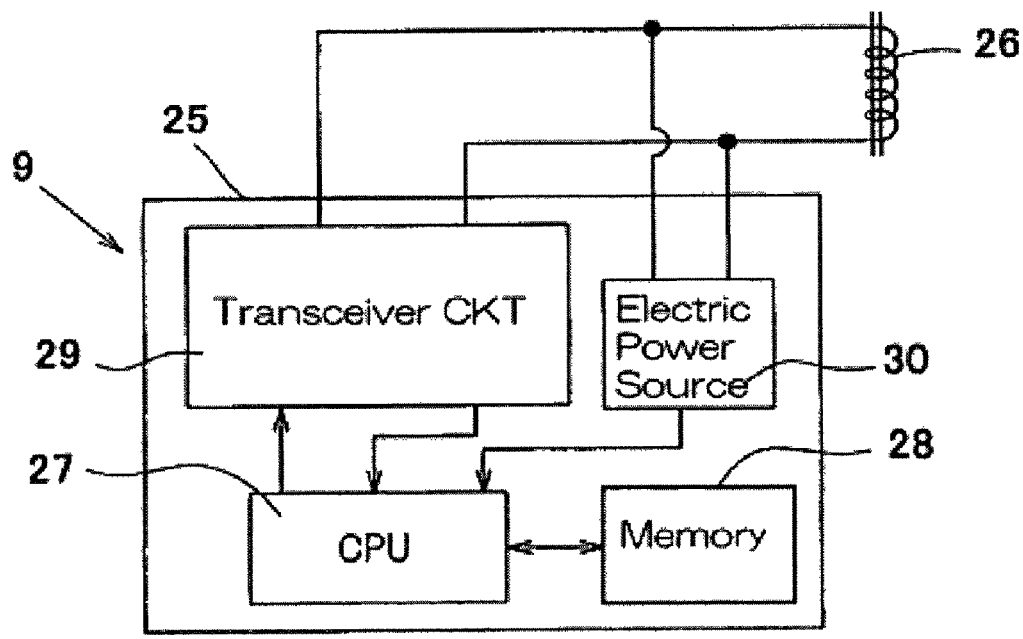
FIG. 12 is a block diagram showing an example of circuit for the IC tag.

The details of the above described IC tag 9 will be specifically described with particular reference to FIGS. 11 and 12. Reading and writing of information from and in the IC tag are carried out through an IC tag communicator 20. For the IC tag communicator 20, if the IC tag 9 is of a read/write type, an IC tag reader/writer is used for the tag communicator 20. But if the IC tag 9 is of a read-only type, a tag reader having no writing functionality is used for the tag communicator 20. The IC tag communicator 20 has an antenna 21 that is directed to the IC tag 9. The IC tag 9 is capable of recording and reading information on a contactless basis or incapable of being overwritten and is made up of an IC chip (integrated circuit chip) 25 and an antenna 26. The IC chip 25 and the antenna 26 are integrally enclosed together with a synthetic resin (not shown). The IC tag is available in various types, shapes and sizes and may be rectangular or plate-like in shape as well as squared or spherical in shape of a size smaller than, for example, 1 mm. Also, an IC tag that can be formed directly on an object by means of printing is also available. The storage capacity is varying, but proper selection may be made depending on the application, the size of an object to which it is affixed, and/or the class.

For the IC tag 9, an RFID tag that conveniently utilizes, for example, the RFID (Radio Frequency Identification) technology can be employed. The RFID type IC tag makes use of a transmission system utilizing, for example, electrostatic coupling, electromagnetic coupling, electromagnetic induction, microwaves and optical beams and, of them, any type can be employed. By way of example, the IC tag of an electromagnetic induction type or a microwave type can be advantageously employed.

FIG. 12 illustrates a specific electric circuit example of the IC tag 9. The IC chip 25 of this IC tag 9 includes a central processing unit (CPU) 27, a storage memory 28, a transceiver circuit 29 and an electric power source circuit 30, and the electric power source circuit 30 is activated with an electric power received by the antenna 26. The storage memory 28 is of a type that does not require an electric power source for the storage of information.

Figure 13:
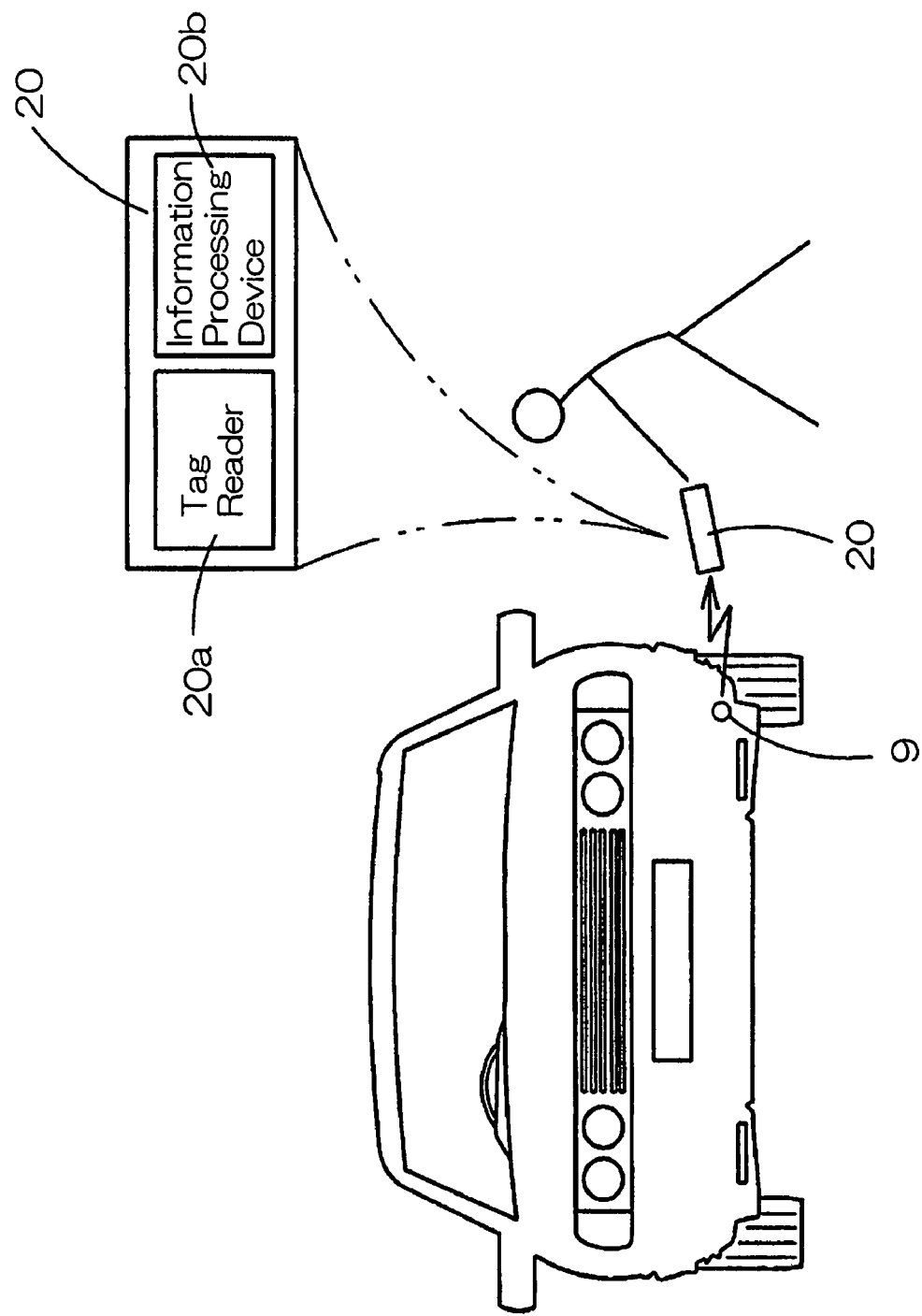
FIG. 13 is an explanatory diagram showing an example of the manner of reading out the IC tag.

According to the bearing device for the wheel 1 of the above described construction, since the IC tag 9 is affixed to an element part that forms a part of this bearing device for the wheel, it is possible to record an identification information such as, for example, the lot number and the manufacturer's serial number of the bearing device for the wheel 1 and, also, to record a manufacturing history information in the IC tag 9. For the manufacturing history information, it includes the site of manufacture, the date of manufacture, information on processing conditions, dimensions after processing and inspection results of various kinds. Information concerning a preload may be recorded in the IC tag 9. Since the IC tag 9 of a contactless communicating type is employed, when the IC tag communicator 20 is appropriately used, information recorded in the IC tag 9 can be read out as shown in, FIG. 13, while the bearing device for the wheel 1 remains fitted to the automotive vehicle. Because of this, it is possible to easily acquire information concerning the bearing device for the wheel, at the time of regular servicing or at the time the necessity occurs. If the IC tag communicator 20 is provided, in addition to a tag reader 20a, with an information processing device 20b for processing results of information read out from the IC tag 9, at the time, it is possible to determine from the manufacturer's serial number or the like whether or not it is a predetermined object to be inspected. Also, if the IC tag 9 of a large storage capacity is employed, it is possible to record in the IC tag, the entire manufacturing history information of various element parts used to form the bearing device for the wheel 1. In such case, without reference required to a database or the like, the manufacturing history information of the bearing device for the wheel can be read out easily.

In the embodiment shown in FIG. 1, the place of installation of the IC tag 9 is chosen to be the outboard side end face 32Aa on an inner diametric side of the hub 32A, which is a forged component part, with respect to the wheel pilot 43. Since this face 32Aa is a face to which no machining is applied subsequently, the IC tag 9 can be affixed thereto immediately after the forging of the hub 32A. However, where a shot blasting is applied immediately after the forging, the IC tag 9 is affixed after it. In this way, the history of the entire manufacturing process steps after the forging, for example, the manufacturing process steps ranging from a primary machining to grinding by way of induction hardening and secondary machining can be brought down, having been recorded for each manufacturing process step. While heat treatment is carried out for, for example, surface hardening of the raceway surfaces 36, since an induction hardening is employed, it is possible to minimize transmission of influences, brought about by a heat treatment, to the IC tag 9 even though the IC tag 9 is affixed immediately after the forging. Also, since in a condition, in which the bearing device for the wheel 1 is fitted to the automotive vehicle, the outboard side end face 32Aa is a face oriented outwardly of the automotive vehicle, the information recorded can easily be read out when the IC tag reader or the like is brought close while the bearing device for the wheel 1 remains fitted to the automotive vehicle.

Figure 2A:
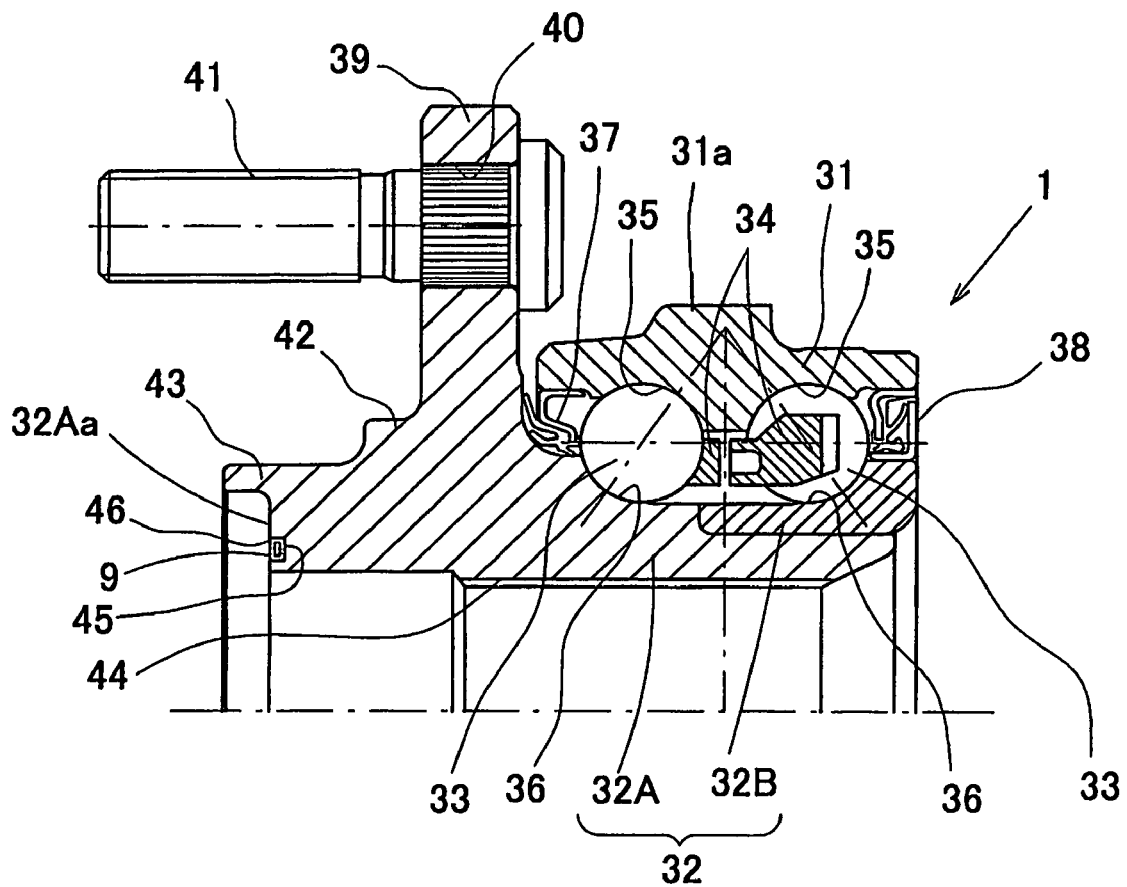
FIG. 2(A) is a fragmentary sectional view of the bearing device for the wheel according to a second preferred embodiment of the present invention.
Figure 2B:
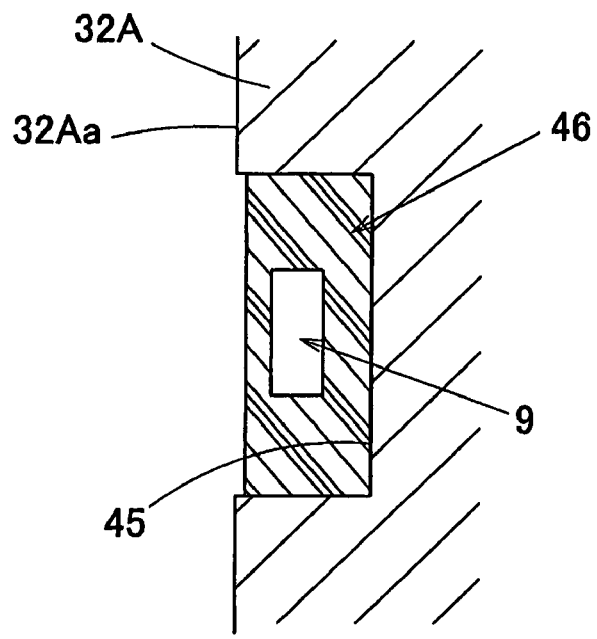
FIG. 2(B) is a fragmentary enlarged view showing a portion thereof.

FIGS. 2(A) and 2(B) illustrate a second preferred embodiment of the present invention. While in the first embodiment shown in FIG. 1, the IC tag 9 has been affixed directly to a surface of the hub 32A, in this second embodiment shown in FIG. 2 a tag mounting recess 45 is provided in the hub 32A and the IC tag 9 is provided within this tag mounting recess 45. In such case, as a countermeasure against radio wave absorption, it is preferable that an electrical insulating member 46 may be provided for covering an inner surface of the tag mounting recess 45 and the IC tag 9 may then be affixed in the form as embedded in this insulating member 46. The insulating member 46 may be a member made of, for example, resin or any other suitable material effective to obtain a gap, in which no electrical interference occurs between a metal and the IC tag 9. In such case, by means of resin molding, the IC tag 9 may be affixed within the tag mounting recess 45. Also, after the IC tag 9 has been covered with the insulating member 46, the IC tag 9 with the covering thereof may be affixed within the tag mounting recess 45.

When the insulating member 46 for covering the inner surface of the tag mounting recess 45 is provided in this way, the IC tag 9 can be read without accompanying a problem such as, for example, radio disturbance on the metallic surface. Also, if it is affixed in the form as embedded, a problem of interference with other articles and a problem of separation will occur hardly. Other structural feature of this embodiment than those described above are similar to those described above in connection with the first embodiment shown in FIG. 1.

It is to be noted that the structure such as shown in FIG. 2(B), in which the insulating member 46 for covering the inner surface of the tag mounting recess 45 is provided and the IC tag 9 is then affixed in the form as embedded in the insulating member 46 or the IC tag 9 is, after having been covered with the insulating member 46, embedded within the tag mounting recess 45, may be applied not only to the case, in which it is affixed to the hub 32A, but also to the case, in which the IC tag 9 is affixed to the outer race 31, core metals of the seals 37 and 38 or a metallic component part.

Figure 3:
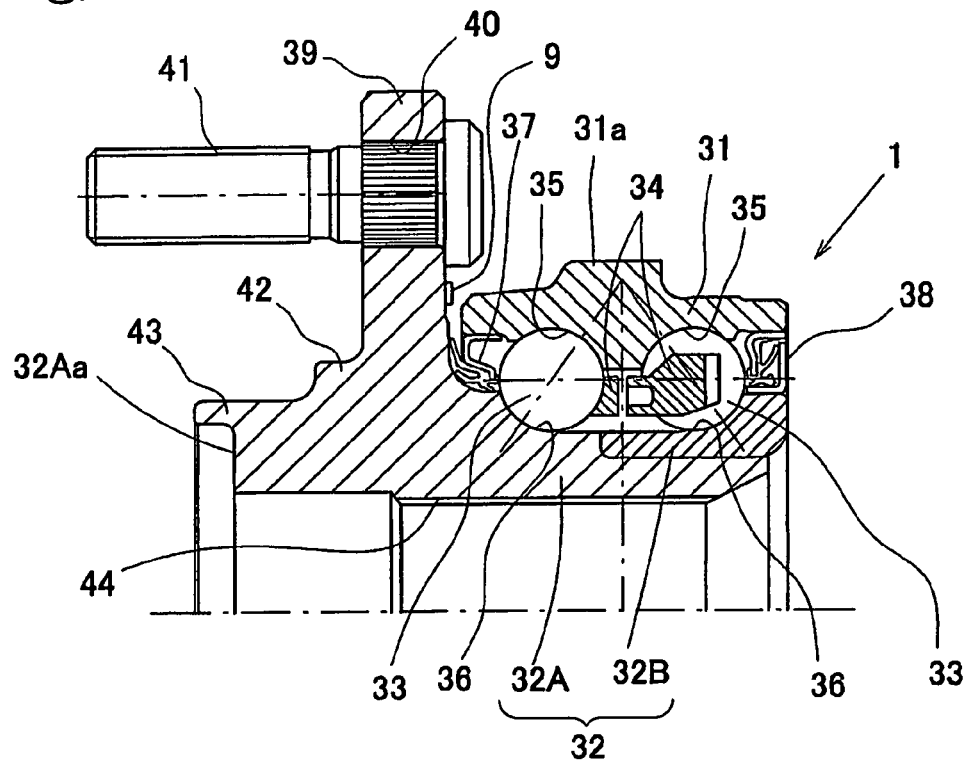
FIG. 3 is a fragmentary sectional view of the bearing device for the wheel according to a third preferred embodiment of the present invention.

In the hub 32A, the place of installation of the IC tag 9 may be a side face on an inboard side of the flange 39 as shown in, for example, FIG. 3 in connection with a third preferred embodiment, other than that described above. This face can provide a space around it even after the bearing device for the wheel 1 has been fitted to the automotive vehicle and communication with the IC tag 9 can be carried out easily.

Figure 4:
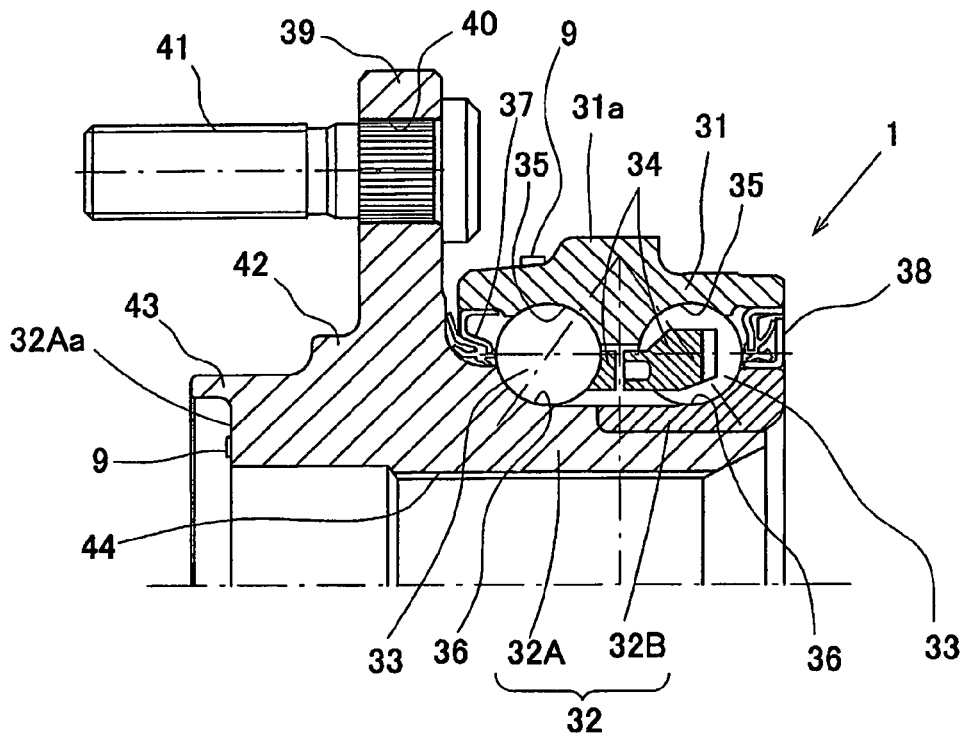
FIG. 4 is a fragmentary sectional view of the bearing device for the wheel according to a fourth preferred embodiment of the present invention.

As shown in FIG. 4 in connection with a fourth preferred embodiment, the IC tag 9 may be affixed to the outer member 31. The place of installation is preferably an outer peripheral surface on the outboard side of the vehicle body fitting flange 31a. This outer peripheral surface portion can provide a space therearound even after the mounting of the bearing device for the wheel 1 on the automotive vehicle and communication with the IC tag 9 can be carried out easily. Since the outer member 31 is generally rendered to be a forged component part, information of the various process steps subsequent to the forging can be recorded when even in this case the IC tag 9 is affixed after the forging.

In the example shown in FIG. 4, the IC tag 9 is affixed to both of the outer member 31 and the hub 32A and, in such case, information on the outer member 31 and the hub 32A after the forging can be recorded in the outer member 31 and the hub 32A, respectively. It is to be noted that even the inner race 32B is a forged component part and the IC tag 9 may be affixed thereto.

Figure 5:
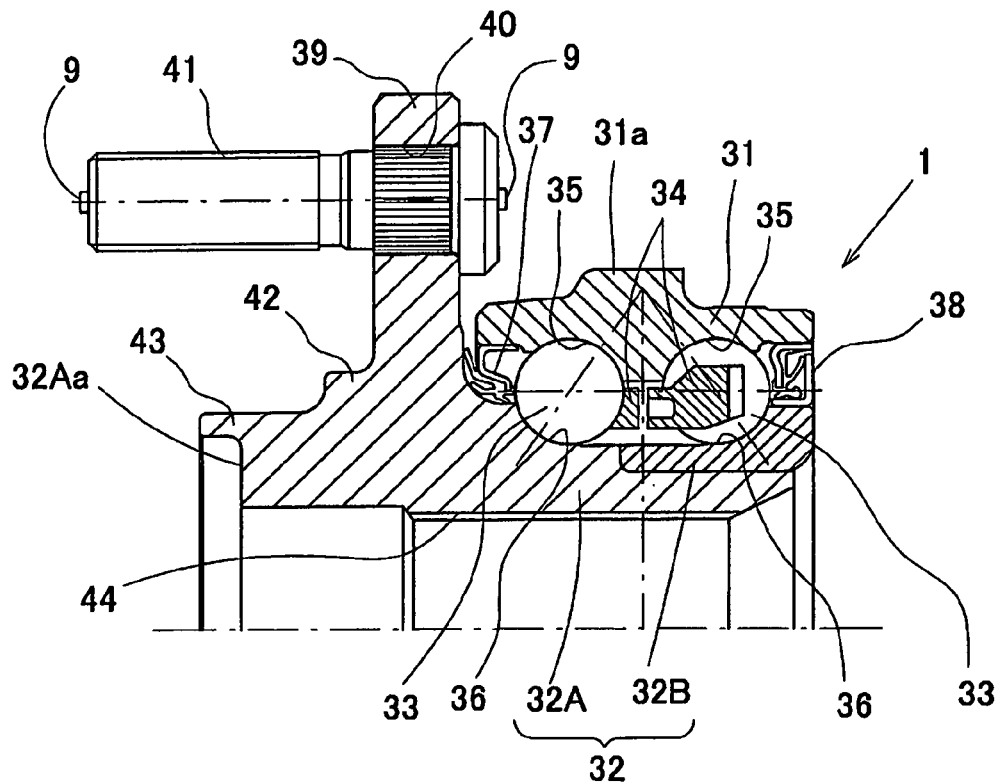
FIG. 5 is a fragmentary sectional view of the bearing device for the wheel according to a fifth preferred embodiment of the present invention.

FIG. 5 illustrates a fifth preferred embodiment, in which the IC tag 9 is affixed to an end face of one of the wheel mounting bolts 41 press-fitted into the respective bolt press-fit holes 40 defined in the flange 39 of the hub 32A. In this figure, although the IC tag 9 is shown as affixed to opposite ends of one of the wheel mounting bolts 41, it is affixed to either one of them. In other words, the IC tag 9 is affixed to a head or one of a free end of a shank of the bolt. Even in this case, the IC tag 9 may be provided on a surface or provided in the form as embedded. Even in the end face of the wheel mounting bolt 41a space therearound can be obtained after the mounting of the bearing device for the wheel 1 on the automotive vehicle and communication with the IC tag 9 can be carried out easily.

The IC tag 9 of a compact construction is available and, when such IC tag 9 is employed, the IC tag 9 can be affixed to a place difficult to be imprinted or marked with a laser beam such as, for example, the bolt end face or the inner diametric side portion of the hub 32A with respect to the wheel pilot 43 as shown in FIG. 1.

Figure 6:
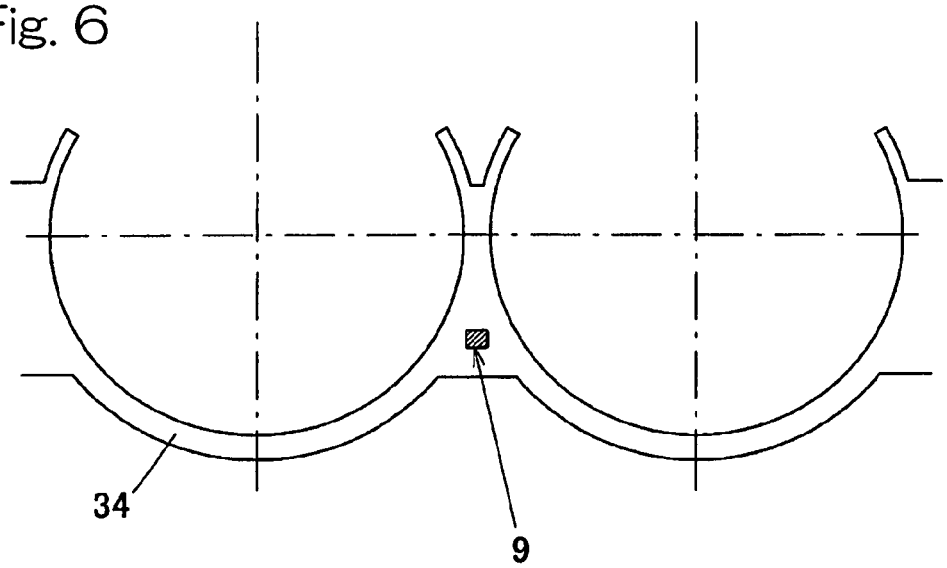
FIG. 6 is a fragmentary sectional view of the bearing device for the wheel according to a sixth preferred embodiment of the present invention.

The place of installation of the IC tag 9 may be a retainer 34 as is the case with a sixth preferred embodiment shown in FIG. 6 other than the above. If the retainer 34 is made of a synthetic resin, the IC tag 9 of a kind that cannot be affixed directly to the metallic surface can be affixed thereto with no problem.

FIG. 7 to FIGS. 10(A) and 10(B) illustrates further preferred embodiments, in which in the bearing device for the wheel 1, the IC tag 9 is affixed to a sensor associated component part. Although they illustrates examples employing a rotation sensor 48, similar is the case, in which a sensor (not shown) for detecting an object to be detected other than rotation, for example, a temperature or a load is provided.

Figure 7:
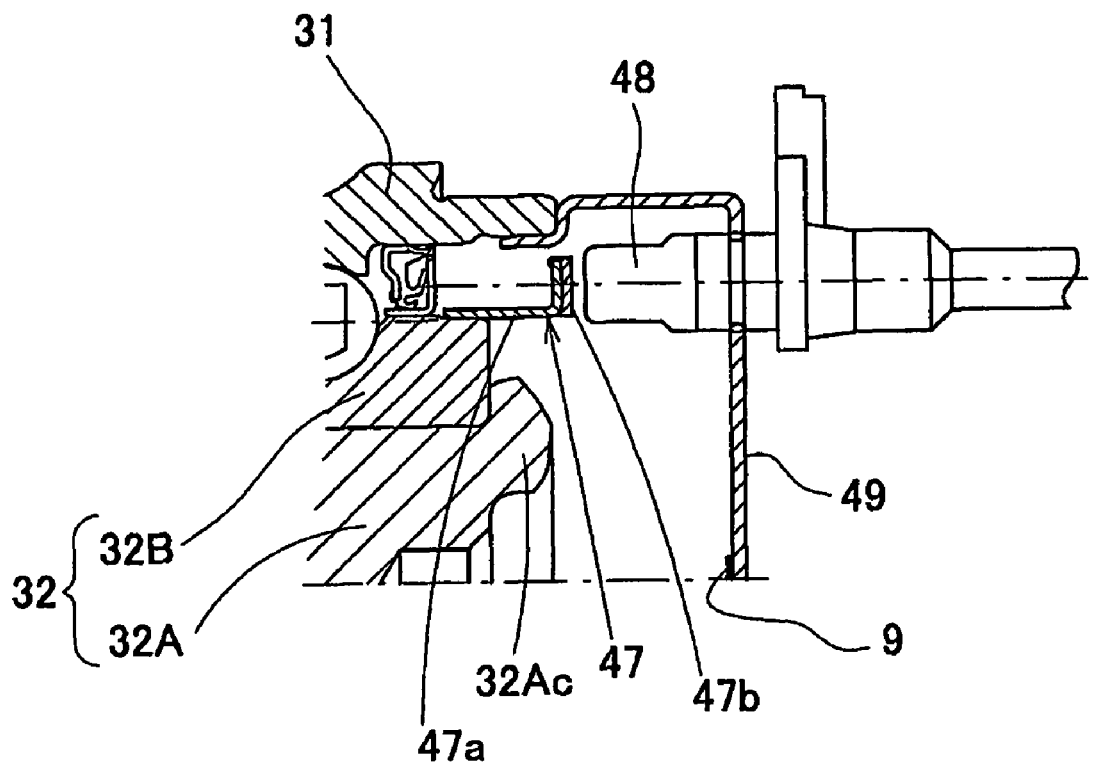
FIG. 7 is a fragmentary sectional view of surroundings of a sensor installation site in the bearing device for the wheel according to a seventh preferred embodiment of the present invention.
Figure 8:
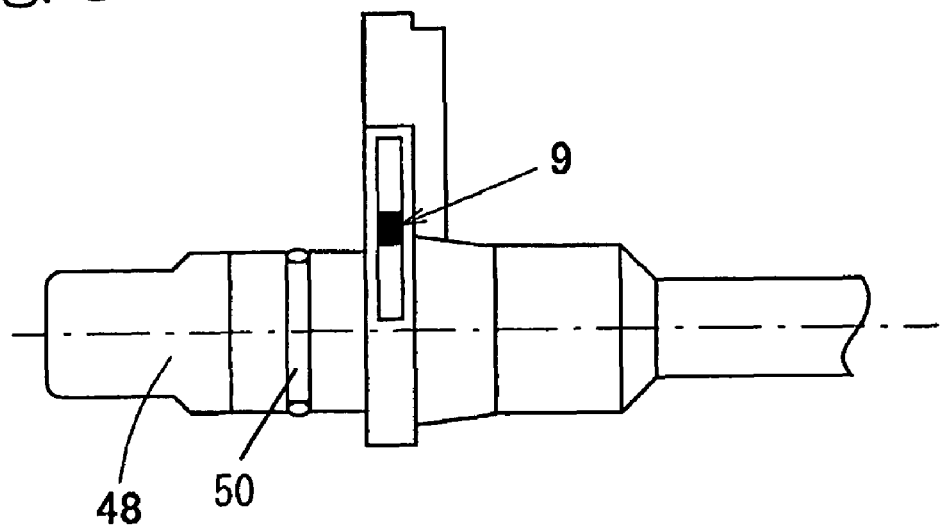
FIG. 8 is an enlarged front view of a sensor, showing an eighth preferred embodiment of the present invention.
Figure 9:
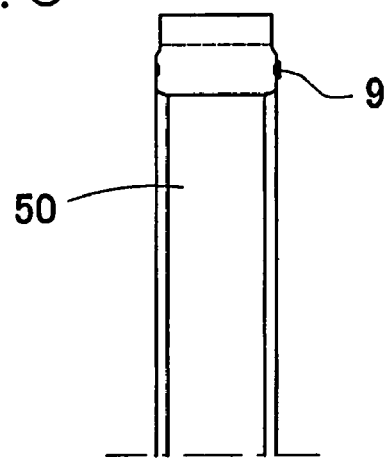
FIG. 9 is a fragmentary enlarged side view of a sensor mounting ring, showing a ninth preferred embodiment of the present invention.

In a seventh preferred embodiment shown in FIG. 7, in the first embodiment, an encoder 47 is fitted to the inner member 32 and a rotation sensor 48 is fitted to the outer member 31 through a sensor cap 49. The encoder 47 is a magnetic encoder made up of a core metal 47a and a multipolar magnet 47b. The rotation sensor 48 is employed in the form of, for example, a Hall element or a magnetoresistive element. The rotation sensor 48 is of a type utilized in controlling an anti-lock brake system. In the case of this embodiment, the inner race 32B is fixed with a staked portion 32Ac of the hub 32A. Also, the bearing device for the wheel 1 in this example is rendered to be for the support of a non-driven wheel of the automotive vehicle. Other structural features as the bearing device for the wheel 1 than those described above are similar to those described in connection with the embodiment shown in FIG. 1.

In the case of the bearing device for the wheel 1 with sensors such as the rotation sensor 48 or the like fitted thereto as described above, the IC tag 9 may be affixed to the encoder 47, which becomes a sensor associated component part, the rotation sensor 48 or a mounting component therefor or the like. By way of example, as shown in FIG. 7, the IC tag 9 may be affixed to the sensor cap 49, or to the rotation sensor 48 as is the case with an eighth preferred embodiment shown in FIG. 8. Other than it, the IC tag 9 may be affixed to a sensor ring 50 where the sensor 48 is fitted to the outer member 31 through the sensor ring 50 as is the case with a ninth preferred embodiment shown in FIG. 9.

The sensor such as, for example, the rotation sensor 48 is generally inspected in an entire number thereof at the time of shipment. For this reason, at the time of inspection, information concerning the initial performance at the time of shipment or the like can be written in the IC tag 9 and, therefore, no extra step of information writing is needed, allowing an efficient writing to be performed. While the product information such as, for example, the model number and/or the manufacturing lot number have hitherto been indicated by imprinting it on a product itself, or printed on a package box, the contents that can be described in the product itself and the package box are limited to a minimum number. If the IC tag 9 is affixed to the sensor associated component part as described above, a substantial amount of information at the time of shipment can be recorded and the information so written can be read out at any time when the necessity arises for examination purpose or the like.

Figure 10A:
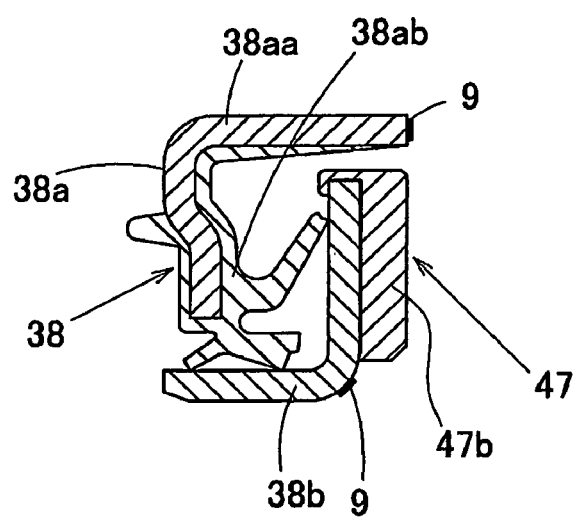
FIGS. 10(A) and 10(B) are sectional views showing respective examples of seals employed in the bearing device for the wheel according to a tenth preferred embodiment of the present invention.
Figure 10B:
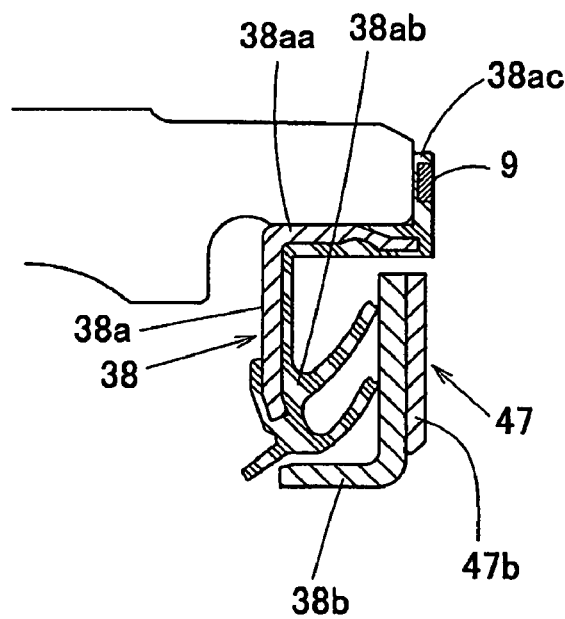

FIGS. 10(A) and 10(B) illustrates a tenth preferred embodiment, in which the IC tag 9 is affixed to the seal 38. In those figures, the seal 38 is rendered to be of a combination type made up of a fixed side seal 38a and a slinger 38b. The fixed side seal 38a is fitted to the outer member 31 shown in FIG. 1 whereas the slinger 38b is fitted to the inner member 32. Also, the fixed side seal 38a is made up of a core metal 38aa and an elastic member 38ab such as, for example, rubber. The slinger 38b concurrently serves as a core metal for the encoder 47 and is provided with a multipolar magnet 47b.

In the tenth embodiment shown in FIG. 10(A), the IC tag 9 is affixed to an end face of the fixed side seal 38a, which is oriented outwardly of the bearing, or to a surface of the slinger 38b, which is oriented outwardly of the bearing. In this figure, examples of installation at various places are shown in the same figure and IC tag 9 is shown at two locations, but those IC tags 9 at those two locations are selectively provided.

In a modification shown in FIG. 10(B), a portion 38ac extending towards an end face of the outer member 31 is provided integrally in the elastic member 38ab such as, for example, rubber of the fixed side seal 38a and the IC tag 9 is provided as embedded in this portion 38ac.

Those examples shown respectively in FIGS. 10(A) and 10(B) are such that since the IC tag 9 is affixed to the face oriented outwardly of the bearing, communication with the IC tag 9 can be easily carried out. In the example shown in FIG. 10(B), since the IC tag 9 is provided embedded in the elastic member 38ac, the IC tag 9 of a kind that cannot be installed directly on a metal can be used and, since it is embedded, the IC tag 9 can be protected.

It is to be noted that in any one of the foregoing embodiments the description has been made as applied to the bearing device for the wheel 1 of the third generation type, the present invention can be equally applied to the bearing device for the wheel of any one of the first to fourth generation types as well as to a double row tapered roller bearing type. Also, any one of the foregoing embodiments has been described in connection with the type, in which the inner member 32 is rotatable, the present invention can also be applied to the bearing device for the wheel of a type in which the outer member is rotatable.

What is claimed is:

1. A bearing device for a wheel for rotatably supporting the wheel relative to a vehicle body, comprising
an outer member having an inner periphery formed with double rows of first raceway surfaces;
an inner member having second raceway surfaces opposed to the first raceway surfaces, wherein the outer member and inner member are formed of forged component parts;
double rows of rolling elements interposed between those opposed first and second raceway surfaces of the outer and inner members; and
an IC tag capable of accomplishing a communication on a contactless basis
wherein the IC tag is affixed to a not mechanically processed surface of at least one of the forged component parts,
wherein the IC tag has recorded therein a history of the manufacturing process and a manufacturing history information, the history of the manufacturing process including steps ranging from a primary machining to grinding by way of induction hardening and secondary machining, the manufacturing history information including the site of manufacture, the date of manufacture, information on processing conditions, inspection results, dimensions after processing and preload.

2. The bearing device for the wheel as claimed in claim 1, wherein at least one of the forged component parts is formed with a tag mounting recess located on the not mechanically processed surface of at least one of the forged component parts, the bearing device further comprising:

an insulating member for covering an inner surface of the tag mounting recess, wherein the IC tag is embedded in the insulating member.

3. The bearing device for the wheel as claimed in claim 1, wherein the not mechanically processed surface of at least one of the forged component parts is a surface not machined subsequent to forging.

4. The bearing device for the wheel as claimed in claim 1, wherein the inner member is made up of a hub and an inner race mounted on an outer periphery of the hub,
wherein the hub is a forged component part, and
wherein the IC tag is affixed to an outboard side end face of the hub on an inner diametric side of a wheel pilot.

5. The bearing device for the wheel as claimed in claim 1, wherein a plurality of IC tags is are affixed to a plurality of the forged component parts, and
wherein information on the bearing device for the wheel is recorded in one of the IC tags and information on the forged component parts, to which the IC tag is affixed, is recorded in others of the IC tags.

* * * * *

UNITED STATES PATENT AND TRADEMARK OFFICE
CERTIFICATE OF CORRECTION

| | | |
|---|---|---|
| PATENT NO. | : 7,896,553 B2 | Page 1 of 1 |
| APPLICATION NO. | : 11/658777 | |
| DATED | : March 1, 2011 | |
| INVENTOR(S) | : Koji Sahashi et al. | |

It is certified that error appears in the above-identified patent and that said Letters Patent is hereby corrected as shown below:

In claim 5, column 12, line 15, the word "is" should be omitted.

Signed and Sealed this
Twenty-eighth Day of June, 2011

David J. Kappos
*Director of the United States Patent and Trademark Office*